No. 742,914. PATENTED NOV. 3, 1903.
G. W. SEDDELMEYER.
COMBINED BOLT HOLDER, WRENCH, AND BOLT EXTRACTOR.
APPLICATION FILED JAN. 26, 1903.
NO MODEL.
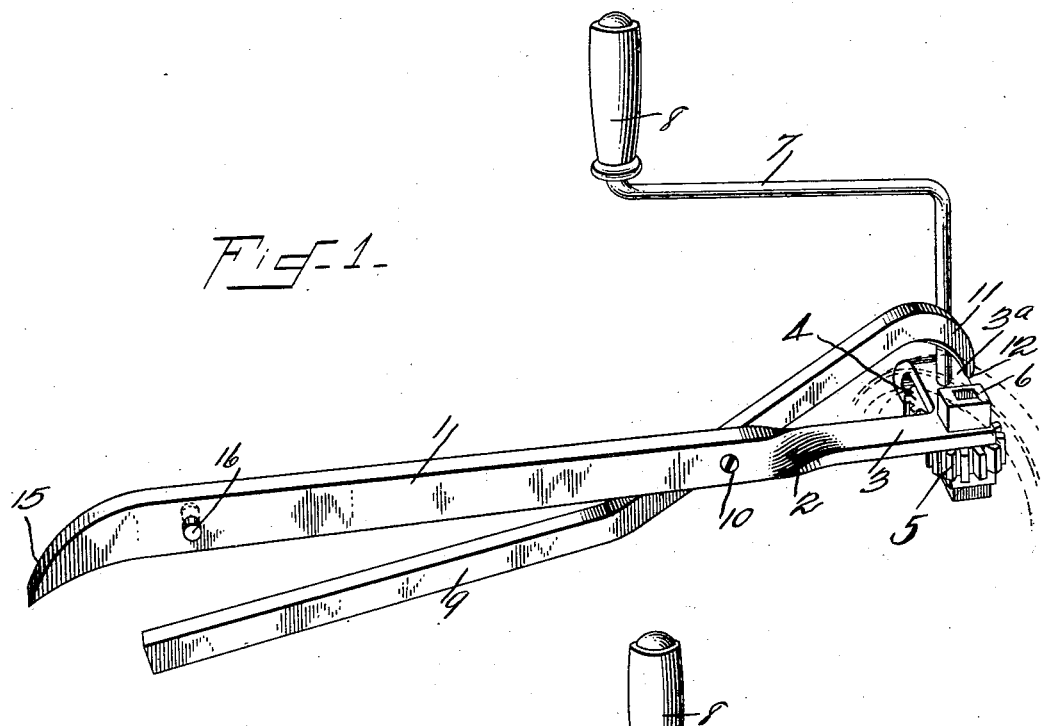
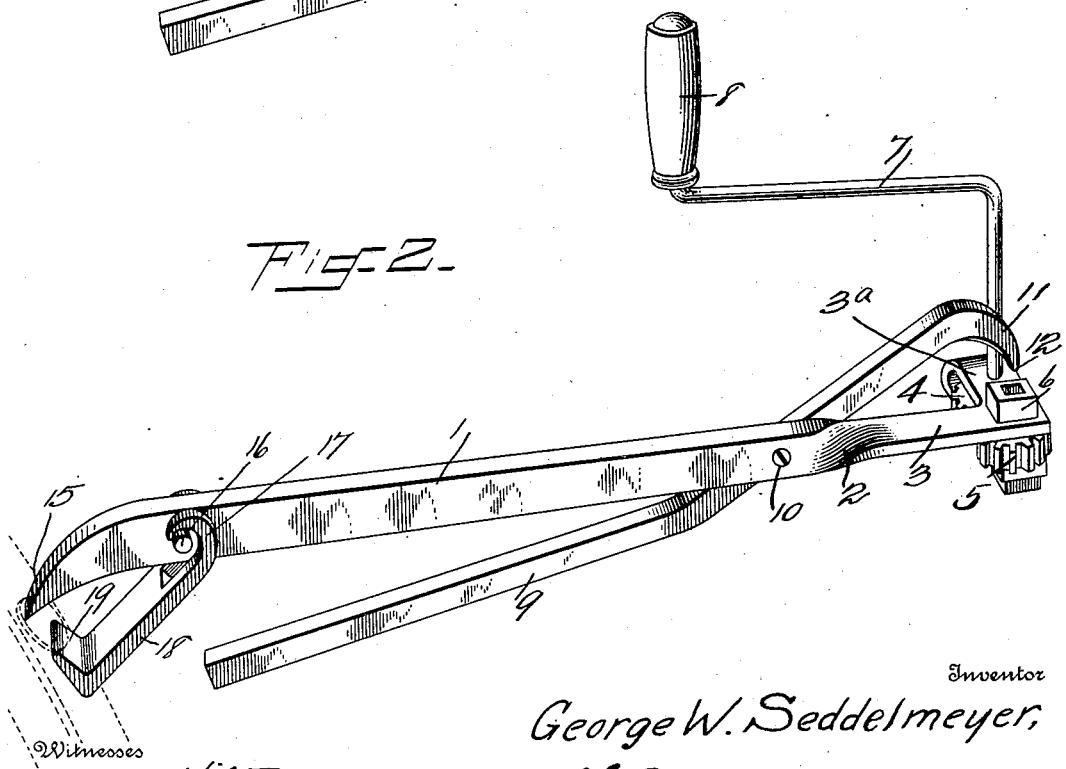
Witnesses
George Hilton
L. Hilton
Inventor
George W. Seddelmeyer,
By H. B. Wilson
Attorney
THE NORRIS PETERS CO., PHOTO-LITHO., WASHINGTON, D. C.

No. 742,914. Patented November 3, 1903.

UNITED STATES PATENT OFFICE.

GEORGE W. SEDDELMEYER, OF EPSOM, INDIANA.

COMBINED BOLT-HOLDER, WRENCH, AND BOLT-EXTRACTOR.

SPECIFICATION forming part of Letters Patent No. 742,914, dated November 3, 1903.

Application filed January 26, 1903. Serial No. 140,658. (No model.)

*To all whom it may concern:*

Be it known that I, GEORGE W. SEDDELMEYER, a citizen of the United States, residing at Epsom, in the county of Daviess and State of Indiana, have invented certain new and useful Improvements in a Combined Bolt-Holder, Wrench, and Bolt-Extractor; and I do declare the following to be a full, clear, and exact description of the invention, such as will enable others skilled in the art to which it appertains to make and use the same.

This invention relates to a combined bolt-holder, wrench, and bolt-extractor.

The object is to provide an implement of this character which is simple of construction, efficient in use, and inexpensive of production and by means of which a bolt may be held from rotation and the nut simultaneously removed and also by means of which refractory bolts may be started and extracted.

With this and other objects in view, which will appear as the nature of the invention is better understood, the invention consists of certain novel features of construction, combination, and arrangement of parts, as will be hereinafter more fully described, and particularly pointed out in the appended claim.

In the accompanying drawings, Figure 1 is a perspective view illustrating the application of the invention in holding a bolt while the nut thereon is being removed. Fig. 2 is a similar view showing the use of the device as a bolt-extractor.

Referring now more particularly to the drawings, the numeral 1 represents a handle-bar, quarter-twisted near one end, as indicated at 2, to form a forwardly-projecting arm 3, carrying a lateral U-shaped bearing $3^a$, in which are mounted intermeshing gears 4 and 5, the latter having connected thereto a nut-receiving socket 6, disposed on top of said bearing $3^a$. The gear 4 receives motion from a shaft 7, provided with an operating crank-handle 8, and in turn imparts motion to the gear 5, as will be understood.

A binding-lever 9 is pivoted at 10 to the bar 1 and provided with a hooked end 11, having a biting edge 12, adapted to bear upon the head of a bolt and hold the same from rotation. By reference to Fig. 1 it will be seen that the hook 11 lies above the bearing $3^a$ and that when the socket of the gear 5 is engaged with a nut upon a wheel-tire bolt the biting end 12 of the hook 11 may be brought into engagement with the head of the bolt and that by resting the palm of the hand upon the bar 1 and engaging and drawing up the lever 9 through the instrumentality of the thumb and fingers the bearing $3^a$ will be supported in position and the hook 11 forced into engagement with the head of the bolt to hold the same against rotation and that thereupon by operating the crank-handle 9 the shaft 7 will be rotated to impart motion to the gears 4 and 5 and turn the nut off of the bolt.

In the present instance I have shown the invention as applied for use for removing a nut from a bolt securing the tire to the rim or felly of a wheel; but it may be used for removing nuts from bolts upon various other objects.

The opposite end of the bar 1 is formed into a downwardly-curved claw 15, having a tapered formation, and in rear of this claw the bar is provided with a pin or projection 16, upon which is hung and pivotally mounted the hooked end 17 of an extracting-lever 18, the rear end of which is provided with a coacting claw 19. These parts are adapted to be employed, as shown in Fig. 2, for extracting refractory bolts from wheel-fellies and other objects. In extracting a bolt the claw 15 is brought into position to take under the head of the bolt, after which the lever 18 is adjusted to bring the claw 19 beneath the head of the bolt, and then by manipulating the tool the bolt may be quickly and conveniently withdrawn. It will thus be seen that by the use of my invention bolts which cannot be withdrawn in the usual manner may be quickly extracted and that after the nut has been removed therefrom by simply tapping the inner end of the bolt to slightly project the head the claws 15 and 19 may be readily brought into gripping engagement and the extracting-lever operated in the manner previously described to remove the bolt.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

A device of the character described, comprising a handle-bar, quarter-twisted so as to form a horizontal arm at its forward end, said arm having on one side a lateral extension bent downwardly and extending backwardly and forming a right-angular U-shaped housing, a lever pivoted to said bar immediately in rear of said arm and having a hooked end adapted to lie above the inner end of said housing, said hooked end terminating in a device for biting or engaging the head of a bolt, gears in mesh and journaled in said housing, one of said gears having a wrench-head or socket disposed upon the top of the arm of the handle-bar, and means for operating the other gear, substantially as described.

In testimony whereof I have hereunto set my hand in presence of two subscribing witnesses.

GEORGE W. SEDDELMEYER.

Witnesses:
T. P. MUDD,
W. C. CRITCHLOW.